United States Patent [19]

Yamada et al.

[11] Patent Number: 5,239,032

[45] Date of Patent: Aug. 24, 1993

[54] HETEROFUNCTIONAL MACROMER COMPOUND, ITS PREPARATION AND POLYMER DERIVED THEREFROM

[75] Inventors: Mitsuo Yamada, Osaka; Kei Aoki, Nara, both of Japan

[73] Assignee: Nippon Paint Co., Ltd., Japan

[21] Appl. No.: 998,026

[22] Filed: Dec. 29, 1992

Related U.S. Application Data

[62] Division of Ser. No. 796,384, Nov. 22, 1991, Pat. No. 5,191,032.

[30] Foreign Application Priority Data

Nov. 30, 1990 [JP] Japan .................................. 2-338960

[51] Int. Cl.⁵ .................... C08F 299/04; C08F 238/00
[52] U.S. Cl. ............................. 526/285; 525/328.1; 525/245; 525/275; 526/301; 526/302; 526/304; 526/322; 522/90; 522/96; 522/97; 522/152; 522/153; 522/154
[58] Field of Search ..................... 526/285; 525/328.1, 525/245, 275

[56] References Cited

U.S. PATENT DOCUMENTS

2,537,643  1/1951  Eberly .............................. 526/285 X
3,562,236  2/1971  D'Alelio ........................ 526/285 X Primary Examiner—Joseph L. Schofer
Assistant Examiner—Mark Nagumo
Attorney, Agent, or Firm—Townsend, Snider & Banta

[57] ABSTRACT

A heterofunctional macromer represented by the formula:

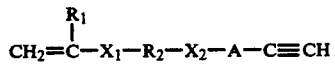

in which $R_1$ is H or $C_1$-$C_4$ alkyl; $R_2$ is a (poly) lactone or (poly) ether chain; $X_1$ is —COO—, —COOCH$_2$CH$_2$OCO—, —CONHCOO—, —COOCH$_2$CH$_2$NH—COO— or

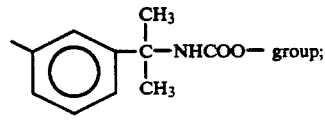

$X_2$ is —O—, —COO— or —OCO—NH—$R_3$—NH—COO— group; $R_3$ is $C_1$-$C_6$ alkylene, aromatic or alicyclic group; A is —CH$_2$—, —C(CH$_3$)$_2$— or

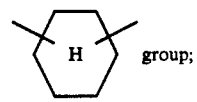

and reactive polymers derived from said macromer.

2 Claims, No Drawings

HETEROFUNCTIONAL MACROMER COMPOUND, ITS PREPARATION AND POLYMER DERIVED THEREFROM

CROSS REFERENCE TO A RELATED APPLICATION

This is a divisional application of co-pending application Ser. No. 07/796,384, filed Nov. 22, 1991, now U.S. Pat. No. 5,191,032.

FIELD OF INVENTION

The present invention relates to a novel heterofunctional macromer compound having in its molecule both polymerizable, ethylenical unsaturation bond and polymerizable ethynyl unsaturation bond, its preparation and a novel reactive polymer obtained by using said compound.

BACKGROUND OF THE INVENTION

In curing a resinous coating composition applied on electric appliance, electronic parts, automobile, air-craft parts, plant material and the like, has been widely adopted a method wherein a curing agent as amino resins, isocyanate compounds blocked isocyanate compounds and the like is compounded with the abovementioned coating composition and applied composition is cured by effecting a cross-linking reaction, or a method wherein unsaturation bonds are beared on the base resin and a curing reaction is effected through oxidative polymerization. However, these curing reactions always require a high temperature and hence, in the case of curing with an aminoplast resin, there are problems of liberation of volatile materials as alcohol, water and the like or problems of stability of the formed bond after said curing reaction, and in the case of curing with an isocyanate compound, problems of handing difficulties of two liquid packages, application difficulties and the like. Attempts have also been made to use a high solid paint with a resinous material having relatively small molecular weight or a resin having specific polymer structure as comb structure, linear structure, star structure or the like to lower the viscosity of the paint composition.

PROBLEMS TO BE SOLVED BY THE INVENTION

Under the circumstances, have long been desired a novel class of reactive polymers which may be further polymerized or copolymerized at with other monomers at a relatively low temperature without liberating undesired volatile materials and can be used as a resinous vehicle in a coating composition. A principal object of the present invention is to provide such novel reactive polymer. Further objects of the invention are to provide a novel macromer to be used in such reactive polymer and to provide a method for the preparation of such macromer.

SUMMARY OF THE INVENTION

According to the present invention, the abovementioned objects of the invention may be attained with a reactive polymer having ethynyl group obtained by the polymerization of a heterofunctional polymerizable macromer compound represented by the formula:

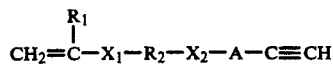

1. A heterofunctional macromer compound represented by the formula:

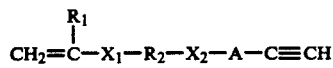

in which $R_1$ is hydrogen atom or an alkyl group having 1 to 4 carbon atoms; $R_2$ is a (poly)lactone or (poly)ether chain having 1 to 50 lactone or ether repeating units; $X_1$ is

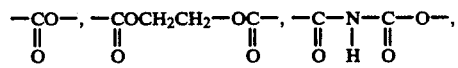

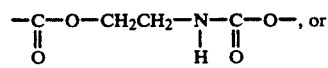

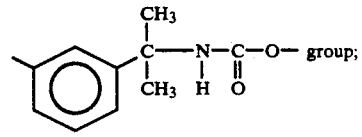

$X_2$ is

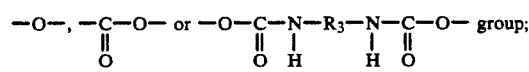

in which $R_3$ is an alkylene having 1 to 6 carbon atoms, aromatic or alicyclic group; A is $-CH_2-$,

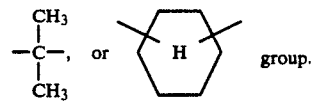

2. A reactive polymer which is obtained by the polymerization of a heteroflunctional macromer compound of the formula:

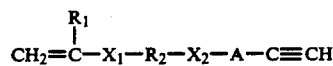

in the presence of a radical initiator, comprises the repeating unit of the formula:

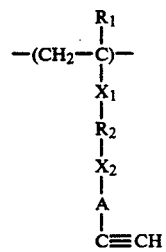

in which $R_1$ is hydrogen atom or an alkyl group having 1 to 4 carbon atoms; $R_2$ is a (poly)lactone or (poly)

ether chain having 1 to 50 lactone or ether repeating units;

$X_1$ is

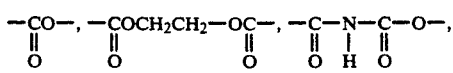

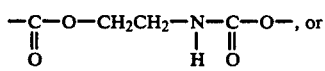

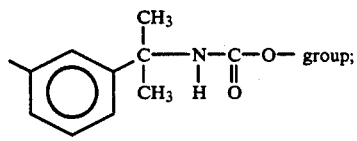

$X_2$ is —O—,

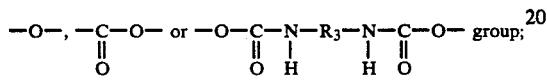

in which $R_3$ is an alkylene having 1 to 6 carbon atoms, aromatic or alicyclic group; A is —$CH_2$—,

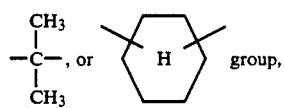 group, and has a number average molecular weight of 3000 to 100,000.

3. A reactive polymer which is obtained by the copolymerization of a heterofunctional macromer compound of the-formula:

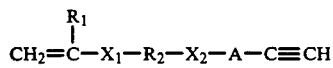

and other copolymerizable vinyl compound in the presence of a radical initiator, the weight ratio of said macromer compound and vinyl compound being 99:1 to 1:99, comprises the repeating unit of the formula:

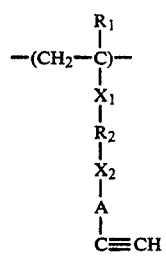

in which $R_1$ is hydrogen atom or an alkyl group having 1 to 4 carbon atoms; $R_2$ is a (poly)lactone or (poly) ether chain having 1 to 50 lactone or ether repeating units;

$X_1$ is

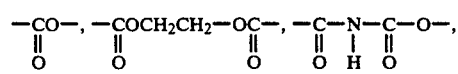

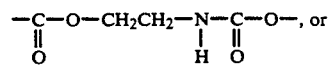

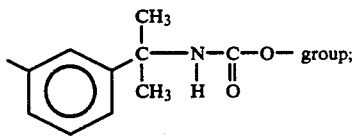

$X_2$ is —O—,

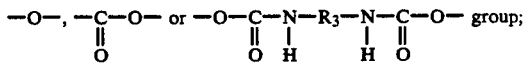

in which $R_3$ is an alkylene having 1 to 6 carbon atoms, aromatic or alicyclic group; A is —$CH_2$—,

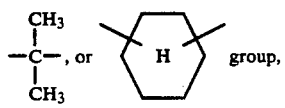 group, and has a number average molecular weight of 3000 to 100,000.

4. A reactive polymer which is obtained by the polymerization of a heterofunctional macromer compound of the formula:

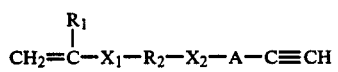

in the presence of a metallic compound, comprises a repeating unit of the formula:

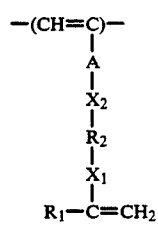

in which $R_1$ is hydrogen atom or an alkyl group having 1 to 4 carbon atoms; $R_2$ is a (poly)lactone or (poly) ether chain having 1 to 50 lactone or ether repeating units;

$X_1$ is

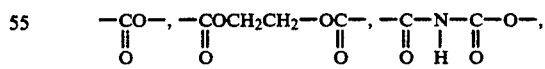

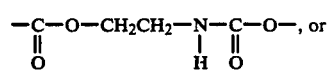

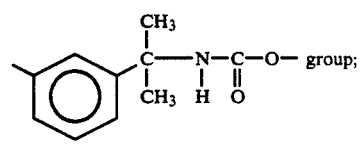

$X_2$ is —O—,

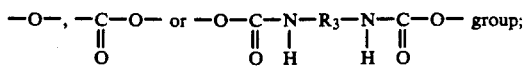 group;

in which $R_3$ is an alkylene having 1 to 6 carbon atoms, aromatic or alicyclic group; A is —$CH_2$—,

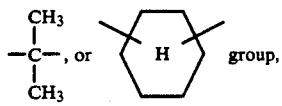 group, and has a number average molecular weight of 3000 to 100,000.

5. A reactive polymer which is obtained by the copolymerization of a heterofunctional macromer compound of the formula:

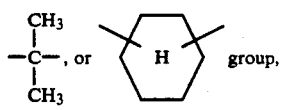

and other ethynyl compound in the presence of a metallic compound the weight ratio of said macromer compound and ethynyl compound being 99:1 to 1:99, comprises a repeating unit of the formula:

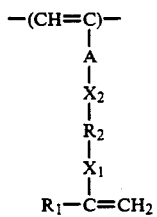

in which $R_1$ is hydrogen atom or an alkyl group having 1 to 4 carbon atoms; $R_2$ is a (poly)lactone or (poly) ether chain having 1 to 50 lactone or ether repeating units; $X_1$ is

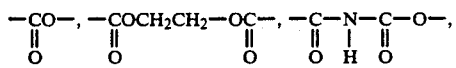

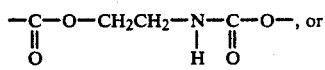

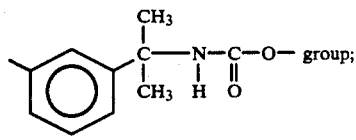 group;

$X_2$ is —O—,

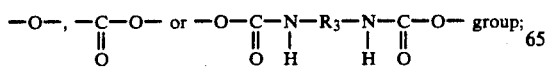 group;

in which $R_3$ is an alkylene having 1 to 6 carbon atoms, aromatic or alicyclic group; A is —$CH_2$—,

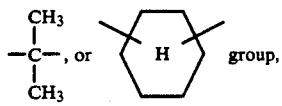 group, and has a number average molecular weight of 3000 to 100,000.

The present heterofunctional macromer compounds and homo- or co-polymers derived from said macromer compounds are prepared as follows.

(1) Preparation of the present heterofunctional macromer compounds

The present heterofunctional macromer compounds represented by the formula:

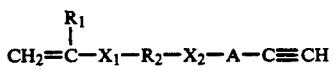

in which $R_1$ is hydrogen atom or an alkyl group having 1 to 4 carbon atoms; $R_2$ is a poly(lactone) or poly ether chain having 1 to 50 repeating lactone or ether unit number; $X_1$ is

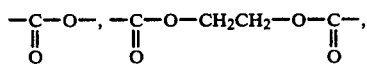

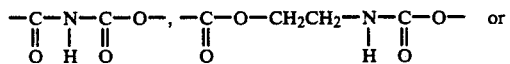

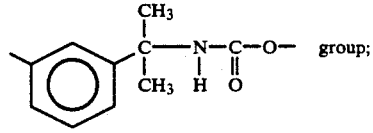 group;

$X_2$ is —O—,

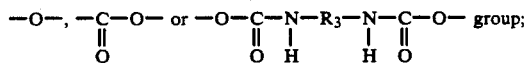 group;

$R_3$ is an alkylene having 1 to 6 carbon atoms, aromatic or alicyclic group;
A is —$CH_2$—,

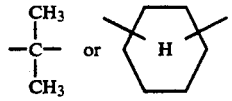

may be advantageously prepared by reacting an ethynyl compound of the formula:

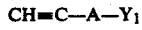

in which A is —$CH_2$—,

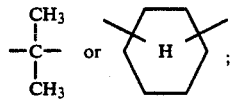 ;

and $Y_1$ is —OH or —NH$_2$ group, with a compound selected from the group consisting of ε-caprolactone, δ-valerolactone, β-methyl-δ-valerolactone, ethyleneoxide, propyleneoxide, tetrahydrofuran, and diisocyanate compound, and then reacting thus obtained compound with an ethylenic compound of the formula:

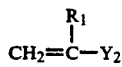

in which R1 is hydrogen atom or an alkyl group having 1 to 4 carbon atoms; and $Y_2$ is an acid halide,

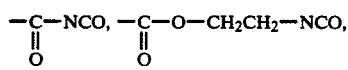

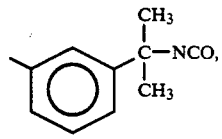

—COOB$_1$—O—(C—B$_2$—O)$_n$ H or —COO(B$_2$O)$_n$ H group; B$_1$ and B$_2$ each represents an alkylene group; and n is an integer of 1 to 50.

Examples of said ethynyl compound represented by the formula:

are CH≡C—CH$_2$—NH$_2$ , CH≡C—CH$_2$—OH ,

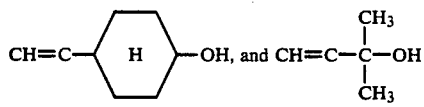

Examples or diisocyanate compounds to be reacted with said ethynyl compound are isophorone diisocyanate and the like. The reaction of the abovementioned ethynyl compound and the compound selected from the group consisting of ε -caprolactone, δ-valerolactone, β-methyl-δ- valerolactone, ethyleneoxide, propyleneoxide, tetrahydrofuran and diisocyanate compounds may be carried out, with or without reaction solvent, under nitrogen atmosphere, by heating the reaction mixture under stirring.

At that time, when a ring-opening catalyst as dibutyl tinoxide, alkali hydroxide and the like is used, cyclic lactone or cyclic ether may be easily ring opened and reacted with the said ethynyl compound.

Thus obtained product is then reacted with an ethylenic compound of the formula:

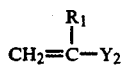

in which R$_1$ and Y$_2$ each has the same meaning as defined above. Examples of the said ethylenic compound are methacrylic acid chloride, methacrylic acid bromide, acrylic acid chloride, acrylic acid bromide, methacryloyl acyl isocyanate, acryloyl acyl isocyanate, isocyanate ethyl methacrylate, m-isopropenyl α, α -dimethyl benzoyl isocyanate, and such compounds as being represented by the formula:

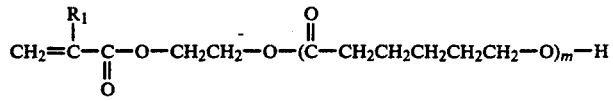

in which m is a positive number of 1 to 50; R$_1$ is H or CH$_3$, and by the formula:

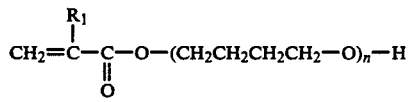

in which n is a positive number of 1 to 50 ; R$_1$ is H or CH$_3$.

This reaction may be advantageously carried out in a solvent as methylene chloride, dichloroethane, carbon tetrachloride and the like, at a temperature of −20 to 100° C. under stirring. Thus, the present heterofunctional macromer compound having reactivity with both ethylenic compound and ethynyl compound can be obtained.

(2) Polymerization

The thus obtained heterofunctional macromer compound may be polymerized by itself or copolymerized with other ethylenically unsaturated monomer(s) in the presence of a radical initiator to give a reactive polymer still having a reactive ethyl group.

Examples of the radical initiator used in the invention are azobisisobutyronitrile, azobisisobutyronitrile, azobispropionitrile, azobisvaleronitrile, diazoaminobenzene, p-nitrobenzene diazonium salt, hydrogen peroxide, ammonium persulfate, benzoylperoxide, t-butylhydroperoxide and the like.

The other ethylenically unsaturated monomers may be of any kinds usually employed for the preparation of vinyl resin, including, for example, vinylacetate, acrylic acid, methacrylic acid, alkylacrylate, alkylmethacrylate, glycidylmethacrylate, glycidyl acrylate, styrene, acrylonitrile and the like. the polymerization is carried out in a solvent as dimethylformamide, dimethyl sulfoxide, toluene, benzene, xylene, methylethylketone, cyclohexanone, butylacetate, ethyleneglycol diacetate, methyl cellosolve, butyl cellosolve and the like, or in an aqueous medium, in the presence of radical initiation, at a temperature which is above the decomposition temperature of said radical initiatior.

The thus obtained polymer is characterized by having a repeating unit of

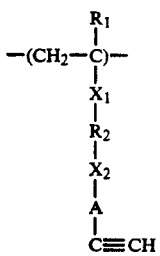

The end ethynyl radical may be further used as a reaction site with other ethynyl compound and in that sense, the present polymer or copolymer may be named as reactive polymer or copolymer.

As to the molecular weight of the present reactive polymer, it is preferably limitted to a range of 3000-100,000.

This is because, the present reactive polymer is principally intended to use as a resinous vehicle for coating composition or as a molding material and hence, an appropriate flowability, viscosity or the like may be required for the said objects.

In the copolymer, the present heterofunctional macromer compound and the other ethylenically unsaturated monomers may be selected in any desired weight ratio, but it is customarily and preferably used in a weight ratio of 99:1 to 1:99.

Alternatively, the present macromer compound may be homopolymerized or copolymerized with other ethynyl compound by making use of the reactivity of the ethynylbond contained.

At that time, a metal compound as, for example, molybdenum or tungsten chloride and the like may be used as an catalyst, to obtain a different type of reactive polymer having a repreating unit of

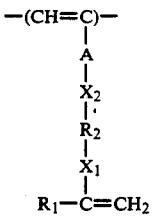

in which $R_1$, $X_1$, $R_2$, $X_2$ and A each has the same meanings as defined above.

Again, it is also preferable to use the weight ratio of the heterofunctional macromer and the ethynyl compound =99:1-1:99, to give the homo- or co-polymer having a number average molecular weight of about 3000 to 100,000.

Examples of the abovementioned ethynyl compounds to be copolymerized with the present macromer compound and the reactive polymer of this invention are esters obtained by the reaction of acrylic or methacrylic acid and propargylamines, ethynylaniline, propargyloxybenzyl alcohol and the like.

Thus obtained polymers, in either case of homopolymer or copolymer, still have self-reactive unsaturation bonds at polymer ends, which may be advantageously used for non-volatile crosslinking reaction by the application of heat or light energy or further reacted with unsaturated monomers to give a highly polymerized product.

(3) Coating composition use

The present heterofunctional macromer compound or its homopolymer or copolymer may be formulated with other optional reactive monomers and polymerization catalyst, and high molecular weight binder, plasticizer, surfactant, coloring matter and the like, to give a solvent type or water dispersion type coating compositions. As an organic solvent, any of the conventional organic solvents customarily used in coating compositions may be satisfactorily used, including ketone solvents as, for example, methylethylketone acetone, methylisobutyl ketone and the like; ester solvents as, for example, ethylacetate, butylacetate, ethyleneglycol diacetate and the like; aromatic solvents as, for example, toluene, xylene and the like; cellosolve solvents as, for example, ethyleneglycol monomethyl ether and the like; alcohol solvents as, for example, methanol, ethanol, propanol, butanol and the like; ether solvents as, for example, tetrahydrofuran, dioxane and the like; halogenated alkyl solvents as, for example, chloroform and the like; or mixtures thereof.

The thus obtained coating composition is applied on a substrate by means of bar-coater, spinner or spraying and the formed coating may be cured by heating at a temperature of 180° C. or less, or by illumination with a semiconductor laser, heliumneon laser, argon laser, helium-cadmium laser, krypton laser or mercury lamp, metal halide lamp, tungsten lamp and the like.

The invention shall be now more fully explained.

EXAMPLE 1

Into a reaction vessel fitted with a stirrer, a reflux condenser, were placed 56.06g(1 mol) of dried propargyl alcohol, 171.2g(1.5 mol) of ε-caprolactone and 0.726g of dibutyltin oxide and the combined was reacted under nitrogen gas stream at 140° C. until the IR characteristic absorption of ε-caprolactone had been disappeared, to obtain an intermediate reaction product A.

17.0g of this reaction product A, 50 ml of methylene chloride, and 11.13 g of triethylamine were weighed in a reactor and 11.50 g(0.11 mol) of methacrylic chloride were dropwise added there to at 20° C. and over 60 minutes.

After completion of said addition, the mixture was reacted for 5 hours and then treated with $H_2O$/methylene chloride to obtain an organic layer, from which the present heterofunctional macromer A was obtained (yield:78%).

H-NMR 2.5 ppm (CH≡C—)
IR:3300cm$^{-1}$;2100cm$^{-1}$ (CH≡C—); 5.8–6.8 ppm$^{-1}$ ($CH_2$=C—)
VPO Mn:240, n=1

EXAMPLE 2

Into a reaction vessel fitted with a stirrer, a reflux condenser and a nitrogen gas inlet tube, were placed 5.60 g of dried propargyl alcohol, 180.22 g (1.8 mol) of δ-valerolactone and 0.928 g of tetraisopropoxytitanate and the combined was reacted under nitrogen gas stream at 140° C. until the IR characteristic absorption of δ-valerolactone had been disappeared. From the reaction mixture, unreacted monomer was distilled off under reduced pressure to obtain an intermediate reaction product B. 18.56 g(0.01 mol) of this reaction product B, 50 ml of methylene chloride, and 1.11 g(0.011 mol) of triethylamine were weighed in a reactor and 1.15 g(0.011 mol) of methacrylic chloride were dropwise added there to at 20° C. and over 60 minutes.

After completion of said addition, the mixture was reacted for 5 hours and then treated with $H_2O$/methylene chloride to obtain an organic layer, from which the present heterofunctional macromer B was obtained (yield;68%).

H-NMR 2.5 ppm (CH≡C—)
IR:3300 cm$^{-1}$;2100 cm$^{-1}$ (CH≡C—); 5.8–6.8 ppm$^{-1}$ (CH$_2$=C—)
VPO Mn:1850, n=18

EXAMPLE 3

Into a pressure reactor, 56.06 g(1 mol) of dried propargyl alcohol and 56.1 g(1mol) of KOH were weighed and 580.8 g(10 mol) of propylene oxide were dropwise added at 90° C. for 3 hours, under pressure. After completion of said addition, the reaction was continued for 10 hours and thereafter, unreacted monomer was distilled off under reduced pressure to obtain an intermediate reaction product C. This product C was treated with an ion-exchange resin to remove KOH contained. 63.4 g of thus obtained product C (0.1 mol) and 50 ml of methylene chloride were weighed in a reactor and 11.1 g(0.1 mol) of methacryloylacyl isocynate were dropwise added under ice cooling over 30 minutes. Thereafter, the reaction was continued at 40° C. for 60 minutes until the remaining isocyanate groups have been disappeared to obtain a heterofunctional macromer C. (Yield 65%)

H-NMR 2.5 ppm (CH≡C—), IR:3300 cm$^{-1}$; 2100 cm$^{-1}$ (CH≡C—); 5.6–6.6 ppm $^{-1}$ (CH$_2$=C)
VPO Mn:750, n=9

EXAMPLE 4

A mixture of 5.5 g (0.1 mol) of dried propargyl amine, 22.2 g (0.1 mol) of isophorone diisocyanate, 0.028 g of dibutyl tin laurate and 20 ml of 1,2-dichloroethane was reacted at 60° C. under nitrogen gas stream and then 1,2-dichloroethane was removed under reduced pressure to obtain an intermediate reaction product D.

To 28.5 g (0.1 mol) of thus obtained product D, FM-5 a hydroxyl group containing vinyl monomer manufactured by Daisel Chem. Co., Ltd., represented by the formula:

$$H_2C=\underset{\underset{CH_3}{|}}{C}-O-CH_2CH_2-(O-\underset{\underset{O}{||}}{C}-CH_2CH_2CH_2CH_2)_5OH.$$

was added and reacted at 80° C. to obtain the present heterofunctional macromer D ( ε -caprolactone modified methacryl monomer).

H-NMR 2.5 ppm (CH≡C—), IR:3300 cm$^{-1}$; 2100 cm$^{-1}$ (CH≡C—); 5.6–6.8 ppm$^{-1}$ (CH$_2$=C)
VPO Mn:950 n=5

EXAMPLE 5

A mixture of 56.0 g (1.0 mol) of dried proparayl alcohol, 22.2 g (1.0 mol) of isophorone diisocyanate, 0.028 g of dibutyl tin laurate and a solvent was reacted at 100° C. under nitrogen atmosphere to obtain an intermediate reaction product E.

To 25.6 g (0.1 mol) of the thus obtained product E, was added Nl-5 (manufactured by Nippon Paint Co.,Ltd. end HO containing methacryloyl polytetramethylene oxide) and the mixture was reacted at 80° C. to obtain a heterofunctional macromer E.

H-NMR 2.5 ppm (CH≡C—), IR:3300 cm$^{-1}$; 2100 cm$^{-1}$ (CH≡C—); 5.6–6.5 ppm$^{-1}$ (CH$_2$=C)
VPO Mn:700 n=5

EXAMPLES 6–9

Following the procedures as stated in Examples 5, the undermentioned heterofunctional macromer compounds were prepared. The structure of the respective compound was confirmed by the test results of IR, H-NMR and VPO.

Example 6

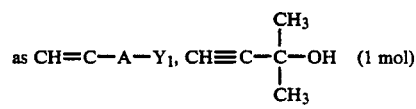

as —R$_2$—, ε-caprolactone (45 mol)

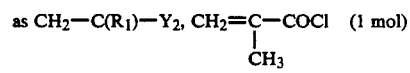

heterofunctional macromer,

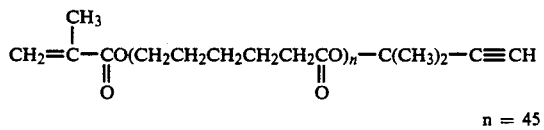

n = 45

Example 7

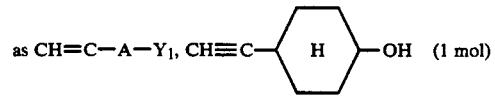

as —R$_2$—, ε-caprolactone (5 mol)

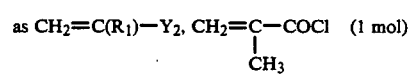

heterofunctional macromer,

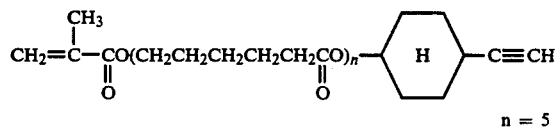

n = 5

Example 8 as CH=C—A—Y$_1$, CH≡C—CH$_2$—OH (1 mol)

as —R$_2$—, ε-caprolactone (5 mol)

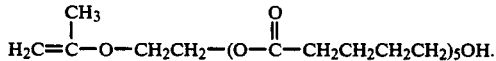

heterofunctional macromer,

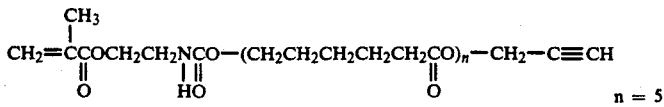

n = 5

Example 9 as CH≡C—A—Y₁, CH≡C—CH₂—OH (1 mol)

as —R₂—, ε-caprolactone (5 mol)

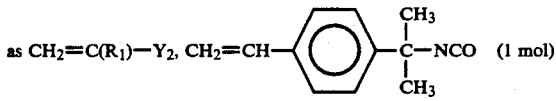 (1 mol)

heterofunctional macromer,

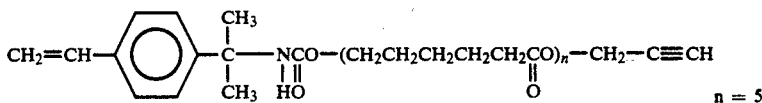

n = 5

3300, 2100 cm⁻¹ (—C≡CH), and 1650 cm⁻¹ (urethane bond).

EXAMPLE 10

Into a reactor fitted with a stirrer, a nitrogen gas inlet tube and a thermo-regulator, were placed 0.1 g of N,N'-azobisisobutyronitrile, 50.0 g of macromer A obtained in Example 1 and 75.0 g of dimethyl formamide and the mixture was, while introducing nitrogen and stirring, heated to 80° C. and the reaction was continued at 80° C. for 6 hours.

The reaction mixture was allowed to cool to room temperature and 100 g of the thus obtained mixture was then dropwise added, while stirring, to 3 liters of hexane.

The precipitated polymer was filtered, washed and vaccum dried to obtain powder polymer.

GPC analysis showed that number average molecular weight of the polymer was 8500 and it had mono-dispersion showing only 1 peak at the molecular weight distribution chart.

IR spectrum showed that there were absorptions at 3300 cm⁻¹, 2100 cm⁻¹ (—C≡CH) and 1720 cm⁻¹ (ester bond).

EXAMPLE 11

Into a reactor fitted with a stirrer, a nitrogen gas inlet tube and a thermo-regulator, were placed 0.1 g of N,N'-azobisisobutyronitrile, 25.0 g of the macromer B obtained in Example 2, 25.0 g of methyl methacrylate and 75.0 g of dimethyl formamide and the mixture was, while introducing nitrogen gas and continuing stirring, heated to 80° C and reacted at the same temperature for 6 hours.

The reaction mixture was allowed to cool to room temperature and 100 g of the reaction mixture was dropwise added, while stirring, to 3 liters of hexane.

The precipitated polymer was filtered, washed and vaccum dried to obtain powder polymer.

GPC analysis showed that number average molecular weight was 10000 and it had mono-dispersion showing only 1 peak at the molecular weight distribution chart. IR spectrum showed that there were absorptions at

EXAMPLE 12

Into a reactor fitted with a stirrer, a nitrogen gas inlet tube and a thermo-regulator, were placed 0.1 g of MoCl₅, 25.0 g of the macromer B obtained in Example 2, and 150.0 g of toluene and the mixture was, while introducing nitrogen gas and continuing stirring, heated to 40° C. and reacted at the same temperature for 10 hours.

The reaction mixture was allowed to cool to room temperature and 100 g of the reaction mixture was dropwise added, while stirring, to 3 liters of hexane.

The precipitated polymer was filtered, washed and vaccum dried to obtain powder polymer.

GPC analysis showed that number average molecular weight was 15000 and it had mono-dispersion showing only 1 peak at the molecular weight distribution chart.

EXAMPLE 13

Into a reactor fitted with a stirrer, a nitrogen gas inlet tube and a thermo-regulator, were placed 0.1 g of MoCl₅, 12.5 g of the macromer A obtained in Example 1, 12.5 g of the macromer B obtained in Example 2, and 150.0 g of toluene and the mixture was, while introducing nitrogen gas and continuing stirring, heated to 40° C. and reacted at the same temperature for 10 hours.

The reaction mixture was allowed to cool to room temperature and 100 g of the reaction mixture was dropwise added, while stirring, to 3 liters of hexane.

The precipitated polymer was filtered, washed and vaccum dried to obtain powder polymer. GPC analysis showed that number average molecular weight was 8000.

EXAMPLE 14

The same procedures as stated in Example 11 were repeated, excepting using 0.02 g of t-BuOK, 300 ml of tetrahydrofuran and 30.0 g of macromer A.

After completion of the reaction, the formed polymer was separated.

GPC showed that the number average molecular weight of the polymer was 6000. IR spectrum showed that there were absorptions at 3300, 2100 cm$^{-1}$ (—C≡CH).

What is claimed is:

1. A reactive polymer which is obtained by the polymerization of a heterofunctional macromer compound of the formula:

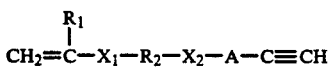

in the presence of a metallic compound, comprises a repeating unit of the formula:

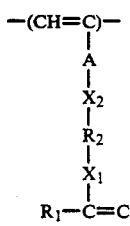

in which $R_1$ is hydrogen atom or an alkyl group having 1 to 4 carbon atoms; $R_2$ is a (poly)lactone or (poly) ether chain having 1 to 50 lactone or ether repeating units; $X_1$ is

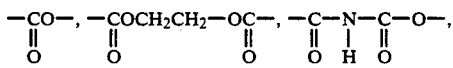

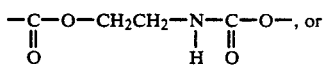

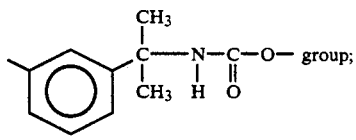

$X_2$ is —O—,

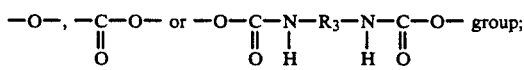

in which $R_3$ is an alkylene having 1 to 6 carbon atoms, aromatic or alicyclic group; A is —CH$_2$—,

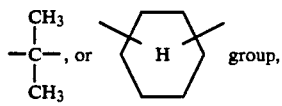

and has a number average molecular weight of 3000 to 100,000.

2. A reactive polymer which is obtained by the copolymerization of a heterofunctional macromer compound of the formula:

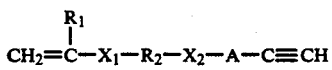

and other ethynyl compound in the presence of a metallic compound the weight ratio of said macromer compound and ethynyl compound being 99:1 to 1:99, comprises a repeating unit of the formula:

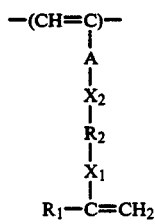

in which $R_1$ is hydrogen atom or an alkyl group having 1 to 4 carbon atoms; $R_2$ is a (poly)lactone or (poly) ether chain having 1 to 50 lactone or ether repeating units; $X_1$ is

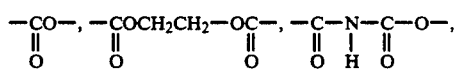

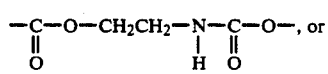

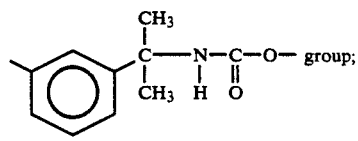

$X_2$ is —O—,

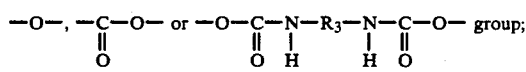

in which $R_3$ is an alkylene having 1 to 6 carbon atoms, aromatic or alicyclic group; A is —CH$_2$—,

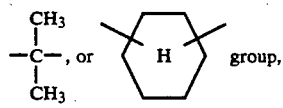

and has a number average molecular weight of 3000 to 100,000.

* * * * *